(12) United States Patent
Inaba et al.

(10) Patent No.: US 11,820,192 B2
(45) Date of Patent: Nov. 21, 2023

(54) STABILIZER

(71) Applicant: NHK SPRING Co., Ltd., Yokohama (JP)

(72) Inventors: Masato Inaba, Yokohama (JP); Junichi Nakayama, Yokohama (JP); Yuichiro Yamauchi, Yokohama (JP)

(73) Assignee: NHK SPRING CO., LTD., Yokohama (JP)

( * ) Notice: Subject to any disclaimer, the term of this patent is extended or adjusted under 35 U.S.C. 154(b) by 0 days.

(21) Appl. No.: 17/623,352

(22) PCT Filed: Jul. 2, 2020

(86) PCT No.: PCT/JP2020/026009
§ 371 (c)(1),
(2) Date: Dec. 28, 2021

(87) PCT Pub. No.: WO2021/002430
PCT Pub. Date: Jan. 7, 2021

(65) Prior Publication Data
US 2022/0363103 A1  Nov. 17, 2022

(30) Foreign Application Priority Data
Jul. 2, 2019  (JP) ................................ 2019-123977

(51) Int. Cl.
*B60G 21/055* (2006.01)
(52) U.S. Cl.
CPC .... *B60G 21/0551* (2013.01); *B60G 2202/135* (2013.01); *B60G 2204/1224* (2013.01); *B60G 2206/427* (2013.01); *B60G 2206/8201* (2013.01)

(58) Field of Classification Search
CPC .......... B60G 2204/1224; B60G 21/055; B60G 21/0551; B60G 2206/427; B60G 2206/8201; B60G 2202/135
See application file for complete search history.

(56) References Cited

U.S. PATENT DOCUMENTS 4,231,555 A * 11/1980 Saito .................... F16F 1/14
267/154
5,954,353 A * 9/1999 Kincaid .................. F16C 7/02
280/124.152

(Continued)

FOREIGN PATENT DOCUMENTS

DE         10237103 A1 *  2/2004 ......... B60G 21/0551
DE    102010030484 A1    12/2011
(Continued)

OTHER PUBLICATIONS

International Search Report for International Application No. PCT/JP2020/026009; dated Aug. 4, 2020.
(Continued)

*Primary Examiner* — Laura Freedman
(74) *Attorney, Agent, or Firm* — CANTOR COLBURN LLP

(57) ABSTRACT

A stabilizer includes a main body cylinder portion which is elastically deformable; and a pair of connection portions respectively connected to a pair of left and right suspension devices. Each of the pair of connection portions is provided with a fixed shaft portion which is solid and fixed to the main body cylinder portion. The fixed shaft portion includes a fitting portion fitted into the main body cylinder portion and a large diameter portion connecting the fitting portion and a connection portion of the pair of connection portions and formed to have a diameter larger than that of the fitting portion.

4 Claims, 4 Drawing Sheets

(56) References Cited

U.S. PATENT DOCUMENTS

| | | | | |
|---|---|---|---|---|
| 6,533,301 | B1 * | 3/2003 | Catania | B60G 21/0551 |
| | | | | 280/124.152 |
| 6,641,151 | B1 * | 11/2003 | Zetterstrom | B60G 21/051 |
| | | | | 280/124.109 |
| 10,220,666 | B2 * | 3/2019 | Kuroda | B60G 21/055 |
| 2010/0059958 | A1 * | 3/2010 | Johnston | B60G 21/055 |
| | | | | 280/124.106 |
| 2019/0291526 | A1 * | 9/2019 | Kuroda | F16C 11/06 |
| 2020/0171910 | A1 * | 6/2020 | Kuroda | B60G 21/055 |
| 2021/0276390 | A1 * | 9/2021 | Kuroda | B60G 7/005 |

FOREIGN PATENT DOCUMENTS

| | | | | |
|---|---|---|---|---|
| DE | 102011056340 A1 * | 6/2013 | | B60G 21/055 |
| DE | 102012205180 A1 | 10/2013 | | |
| DE | 102014219605 A1 | 3/2016 | | |
| DE | 102015114550 A1 * | 3/2016 | | B60G 21/051 |
| DE | 102017108373 A1 | 8/2018 | | |
| EP | 2357099 A1 * | 8/2011 | | B21K 21/12 |
| JP | 58105816 A * | 6/1983 | | |
| JP | 59046707 U | 3/1984 | | |
| JP | 61182310 U | 11/1986 | | |
| JP | 62127807 U | 8/1987 | | |
| JP | 01182109 A * | 7/1989 | | |
| JP | 09226344 A * | 9/1997 | | B60G 21/0551 |
| JP | 11005425 A * | 1/1999 | | B60G 21/0551 |
| JP | 11157317 A | 6/1999 | | |
| JP | 2015189339 A | 11/2015 | | |
| KR | 1020190073508 A | 6/2019 | | |
| WO | 2006024271 A2 | 3/2006 | | |
| WO | WO-2018043248 A1 * | 3/2018 | | B60G 21/055 |

OTHER PUBLICATIONS

IPIN Office Action for corresponding IN Application No. 202247005224; dated May 23, 2022.

EPO Extended European Search Report for corresponding EP Application No. 20835477.9; dated Jun. 26, 2023.

* cited by examiner

STABILIZER

CROSS REFERENCE TO RELATED APPLICATIONS

This is the U.S. national stage of application No. PCT/JP2020/026009, filed on Jul. 2, 2020. Priority under 35 U.S.C. § 119(a) and 35 U.S.C. § 365(b) is claimed from Japanese Application No. 2019-123977 filed Jul. 2, 2019, the disclosure of which is also incorporated herein by reference.

TECHNICAL FIELD

The present invention relates to a stabilizer.

BACKGROUND ART

For example, as shown in Patent Literature 1 below, a stabilizer is known which includes an elastically deformable main body cylinder portion and a pair of connection portions respectively connected to a pair of left and right suspension devices, wherein a fixed shaft portion which is solid and fitted into the main body cylinder portion is provided to the connection portion and an opening end edge of the main body cylinder portion is joined by welding to an outer peripheral surface of a portion in the fixed shaft portion protruding from the inside of the main body cylinder portion toward the outside.

RELATED ART DOCUMENTS

Patent Documents

[Patent Document 1]
Japanese Unexamined Patent Application, First Publication No. S59-46707

SUMMARY

Technical Problem

However, the conventional stabilizer has a problem in that sealing of the inside of the main body cylinder portion and improvement of the fatigue strength are difficult.

The present invention has been made in view of such circumstances and an object of the present invention is to provide a stabilizer realizing both an operation of sealing the inside of a main body cylinder portion and an operation of improving fatigue strength.

Solution to Problem

In order to solve the above-described problems and attain such an object, a stabilizer of a first aspect includes: a main body cylinder portion which is elastically deformable; and a pair of connection portions respectively connected to a pair of left and right suspension devices, wherein a fixed shaft portion which is solid and fixed to the main body cylinder portion is provided to the connection portion, wherein the fixed shaft portion includes a fitting portion fitted into the main body cylinder portion and a large diameter portion connecting the fitting portion and the connection portion and formed to have a diameter larger than that of the fitting portion, and wherein the stabilizer is provided with a first welded portion joining an opening end edge of the main body cylinder portion and the large diameter portion and continuously extending over the entire length thereof in a circumferential direction around a center axis of the main body cylinder portion and a second welded portion joining an inner peripheral surface of the main body cylinder portion and an outer peripheral surface of the fitting portion.

According to the present invention, since the fixed shaft portion includes a large diameter portion formed to have a diameter larger than that of the fitting portion, a step portion formed in the large diameter portion can be abutted against the opening end edge of the main body cylinder portion when joining the opening end edge of the main body cylinder portion and the large diameter portion. Accordingly, the fixed shaft portion can be easily and reliably brought into contact with the main body cylinder portion over the entire circumference thereof compared to the case in which the inner peripheral surface of the main body cylinder portion is brought into contact with the outer peripheral surface of the fitting portion. Then, since the opening end edge of the main body cylinder portion and the large diameter portion are continuously joined over the entire length thereof in the circumferential direction by the first welded portion, the inside of the main body cylinder portion can be reliably sealed. Further, since the first welded portion joins the opening end edge of the main body cylinder portion and the large diameter portion, it is possible to ensure a wide joint area between the main body cylinder portion and the fixed shaft portion compared to the second welded portion joining the inner peripheral surface of the main body cylinder portion and the outer peripheral surface of the fitting portion and to improve fatigue strength.

Since the step portion of the large diameter portion can be abutted against the opening end edge of the main body cylinder portion when joining the opening end edge of the main body cylinder portion and the large diameter portion, it is possible to easily and accurately determine the relative position of the main body cylinder portion and the fixed shaft portion in the axial direction along the center axis at the time of the joining.

Since both the first welded portion and the second welded portion are provided, it is possible to reliably improve fatigue strength.

Since the fixed shaft portion and the main body cylinder portion are joined to each other by welding and are separate members, it is possible to increase the thicknesses of the fixed shaft portion and the connection portion, for example, even when the main body cylinder portion is made thinner to decrease the weight of the stabilizer and thus to ensure the strength of the fixed shaft portion and the connection portion.

Here, according to a second aspect of the present invention, in the first aspect, the first welded portion and the second welded portion are connected to each other and continuously extend.

In this case, since the first welded portion and the second welded portion are connected to each other and continuously extend, it is possible to continue the operation of the manufacturing apparatus without stopping the operation by using the same manufacturing apparatus when forming the first welded portion and the second welded portion and to improve the manufacturing efficiency.

Further, according to a third aspect of the present invention, in the second aspect, wherein the second welded portion continuously extends over the entire length thereof in the circumferential direction, wherein an intermediate welded portion is provided between the first welded portion and the second welded portion to join the inner peripheral surface of the main body cylinder portion and the outer peripheral surface of the fitting portion, and wherein the first welded portion, the second welded portion, and the intermediate welded portion are connected to each other and extend in an endless shape.

In this case, since the first welded portion, the second welded portion, and the intermediate welded portion are connected to each other and extend in an endless shape, it is possible to prevent the occurrence of a terminal portion that is easily deteriorated in the first welded portion, the second welded portion, and the intermediate welded portion. Accordingly, it is possible to reliably improve fatigue strength and to prevent deterioration of appearance.

Since the first welded portion, the second welded portion, and the intermediate welded portion are connected to each other and extend in an endless shape, it is possible to ensure a wide joint area between the main body cylinder portion and the fixed shaft portion and to reliably improve fatigue strength.

Further, according to a fourth aspect of the present invention, in the third aspect, the intermediate welded portion extends in the circumferential direction over an angle range exceeding 360° around the center axis of the main body cylinder portion.

In this case, since the intermediate welded portion extends in the circumferential direction over an angle range exceeding 360° around the center axis of the main body cylinder portion, it is possible to ensure the length of the intermediate welded portion and to reliably improve fatigue strength.

Advantageous Effects of Invention

According to the present invention, it is possible to realize both an operation of sealing the inside of a main body cylinder portion and an operation of improving fatigue strength.

DETAILED DESCRIPTION

Hereinafter, a first embodiment of a stabilizer according to the present invention will be described with reference to FIG. 1 to FIG. 4.

Figure 1:
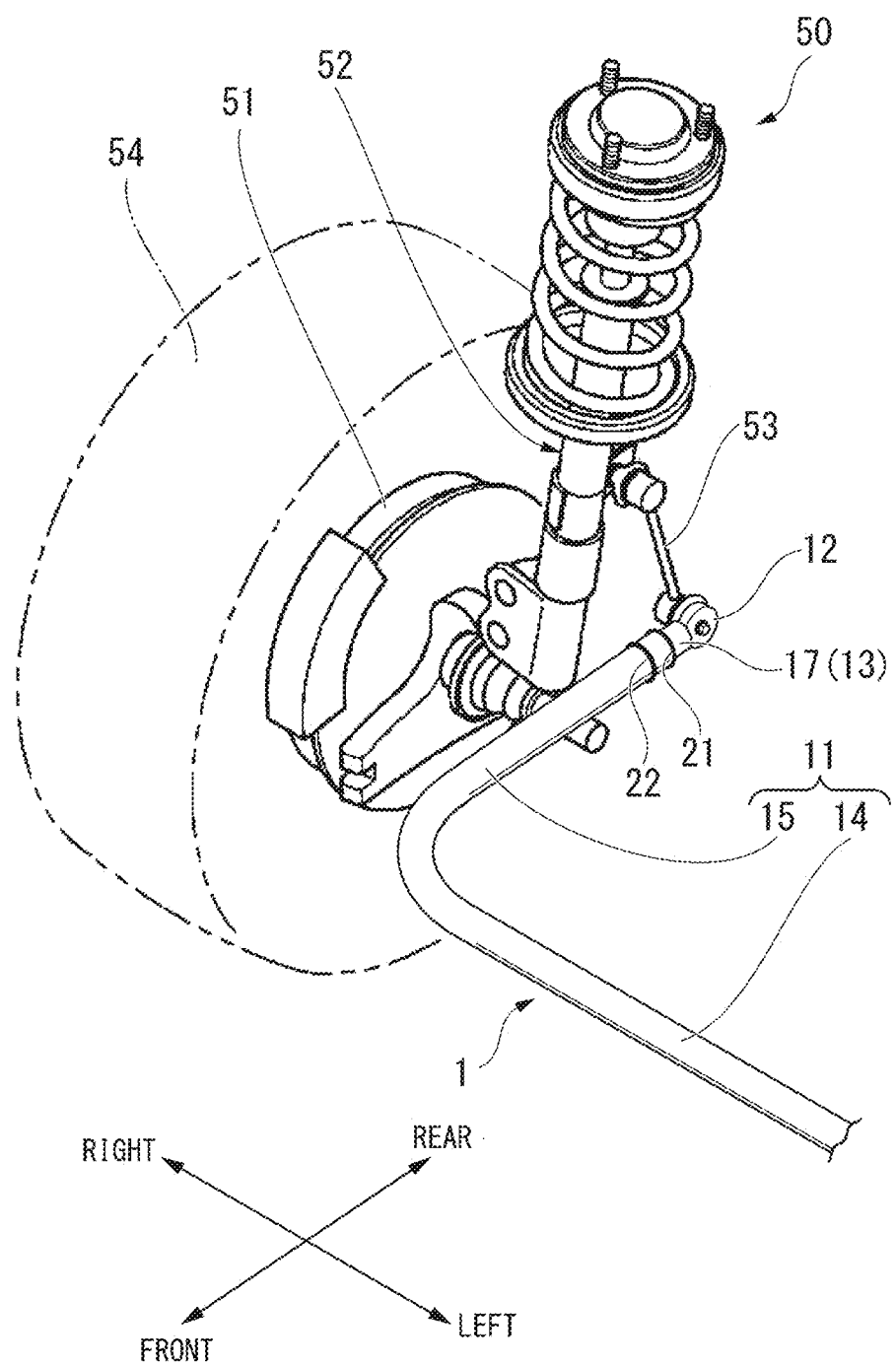
FIG. 1 is a perspective view showing a state in which a stabilizer shown as a first embodiment of the present invention is attached to a suspension device.

As shown in FIG. 1, a stabilizer 1 of this embodiment includes a main body cylinder portion 11 and a connection portion 12 and connects a pair of left and right suspension devices 50. The main body cylinder portion 11 and the connection portion 12 are formed of, for example, carbon steel.

First, the suspension device 50 will be described.

The suspension device 50 includes a support portion 51 which rotatably supports a vehicle wheel 54, a shock absorber 52 which includes a cylinder having a lower end portion attached to the support portion 51, and a stabilizer link 53 which connects the cylinder of the shock absorber 52 and the stabilizer 1.

Hereinafter, the stabilizer 1 will be described based on a state in which the stabilizer is positioned to be attached to the suspension device 50.

The main body cylinder portion 11 includes a tubular torsion portion 14 which extends in the left and right direction of the vehicle and a pair of tubular arm portions 15 which respectively extend toward the rear side of the vehicle from both end portions of the torsion portion 14 in the left and right direction, and the main body cylinder portion 11 is formed to be elastically deformable. Hereinafter, the left and right direction of the vehicle may be simply referred to as the left and right direction, and the front and rear direction of the vehicle may be simply referred to as the front and rear direction.

The length of the torsion portion 14 is longer than the length of the arm portion 15. The outer peripheral surface of the torsion portion 14 extends straight in the left and right direction over the entire length thereof in the left and right direction. The outer peripheral surface of the arm portion 15 extends straight in the front and rear direction over the entire length thereof in the front and rear direction. Each of the inner diameter and the outer diameter of the torsion portion 14 is the same over the entire length thereof. Each of the inner diameter and the outer diameter of the arm portion 15 is the same over the entire length thereof. The inner diameter and the outer diameter of the torsion portion 14 are respectively the same as the inner diameter and the outer diameter of the arm portion 15. The connection portion between the torsion portion 14 and the arm portion 15 is bent to be convex toward the outside in the left and right direction.

Additionally, the length of the torsion portion 14 may be equal to or shorter than the length of the arm portion 15. The torsion portion 14 and the arm portion 15 may be curved. The inner diameters of the torsion portion 14 and the arm portion 15 may be different from each other and the outer diameters of the torsion portion 14 and the arm portion 15 may be different from each other.

The connection portion 12 protrudes straight toward the rear side of the vehicle from the arm portion 15 of the main body cylinder portion 11. That is, the pair of connection portions 12 are respectively provided at both ends of the main body cylinder portion 11. Additionally, the connection portion 12 may protrude while being bent backward from the arm portion 15 of the main body cylinder portion 11. The connection portion 12 is formed in a plate shape in which the two side surfaces thereof face the left and right direction of the vehicle.

The connection portion 12 is provided with a through-hole 12a which penetrates the connection portion 12 in the plate thickness direction. The connection portion 12 is connected to the stabilizer link 53 by screwing a nut into a bolt while the bolt is inserted into the through-hole 12a and a through-hole formed in the stabilizer link 53.

In the above-described configuration, the stabilizer 1 reduces the displacement of the vehicle in the roll direction by being elastically deformed when the displacement amount of the pair of left and right shock absorbers 52 is different, for example, when the vehicle is turning.

Figure 2:
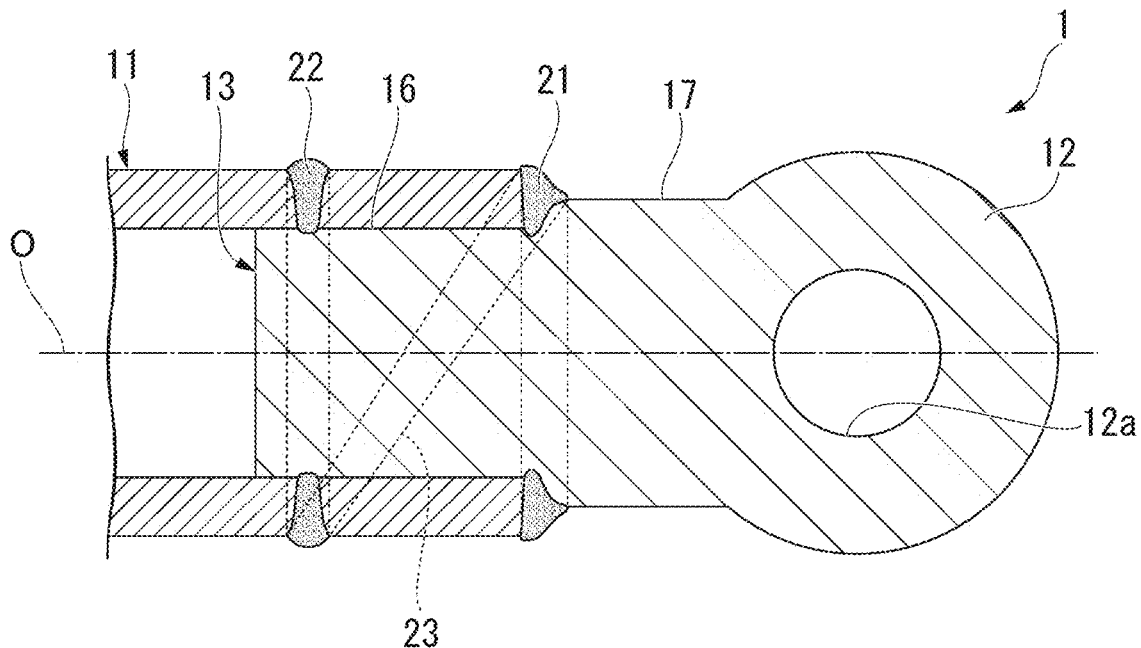
FIG. 2 is a partially longitudinal sectional view of the stabilizer shown as the first embodiment of the present invention.

The connection portion 12 is provided with a solid fixed shaft portion 13 fixed to the main body cylinder portion 11. The fixed shaft portion 13 extends toward the front side of the vehicle from the connection portion 12. The fixed shaft portion 13 is integrally formed with the connection portion 12. As shown in FIG. 2, the fixed shaft portion 13 includes a fitting portion 16 which is fitted into the main body cylinder portion 11 and a large diameter portion 17 which connects the fitting portion 16 and the connection portion 12 and is formed to have a diameter larger than that of the fitting portion 16. The fitting portion 16 and the large diameter portion 17 are arranged coaxially with the center axis O of the main body cylinder portion 11. The outer diameter of the large diameter portion 17 is smaller than the outer diameter of the main body cylinder portion 11. Additionally, the outer diameter of the large diameter portion 17 may be equal to or larger than the outer diameter of the main body cylinder portion 11.

The stabilizer 1 is provided with a first welded portion 21, a second welded portion 22, and an intermediate welded portion 23 for joining the fixed shaft portion 13 and the main body cylinder portion 11.

The first welded portion 21 joins an opening end edge 11a of the main body cylinder portion 11 and the large diameter portion 17 and continuously extends over the entire length thereof in the circumferential direction around the center axis O of the main body cylinder portion 11. The position of the first welded portion 21 in the axial direction along the center axis O is the same over the entire length thereof in the circumferential direction.

Figure 3:
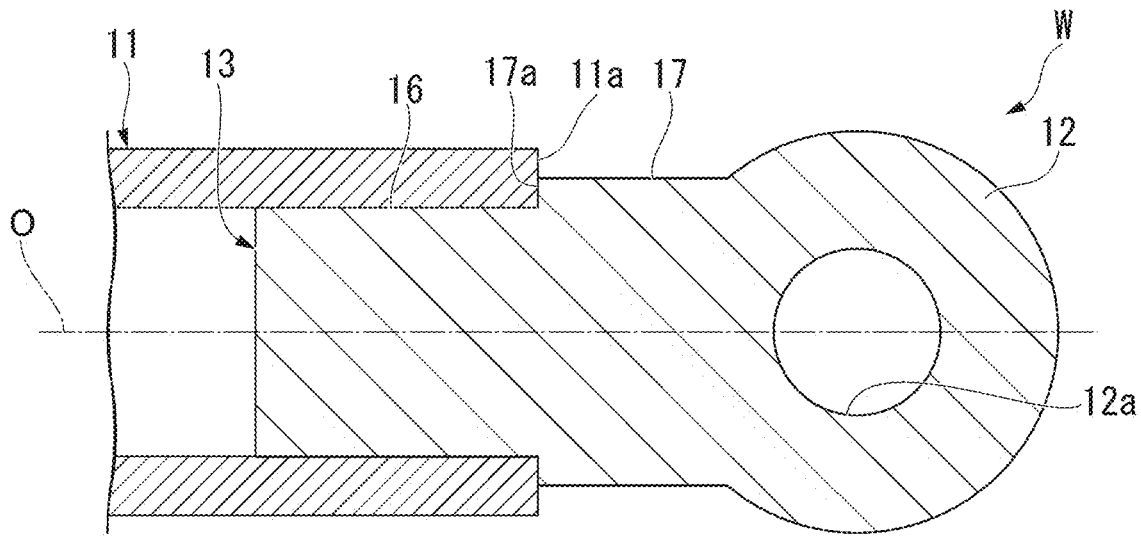
FIG. 3 is an explanatory diagram illustrating a method for manufacturing a stabilizer shown as an embodiment of the present invention.

The first welded portion 21 is provided in the entire area in the radial direction (the thickness direction) of the main body cylinder portion 11. As shown in FIG. 3, the first welded portion 21 is formed by melting and integrating the contact portion between a step portion 17a and the opening end edge 11a of the main body cylinder portion 11 while the opening end edge 11a of the main body cylinder portion 11 and the step portion 17a of the large diameter portion 17 are abutted against each other.

Additionally, the first welded portion 21 may be provided only in the portion located inside in the radial direction in relation to the outer peripheral portion in the opening end edge 11a of the main body cylinder portion 11.

The second welded portion 22 joins the inner peripheral surface of the main body cylinder portion 11 and the outer peripheral surface of the fitting portion 16. The second welded portion 22 is separated from the first welded portion 21 in the axial direction. The second welded portion 22 is formed by melting and integrating the entire area in the radial direction (the thickness direction) of the main body cylinder portion 11 and the outer peripheral surface of the fitting portion 16 while the fitting portion 16 is fitted into the main body cylinder portion 11. The second welded portion 22 and the first welded portion 21 are connected to each other and continuously extend. The second welded portion 22 and the first welded portion 21 may be independently provided to be separated from each other.

The second welded portion 22 continuously extends over the entire length thereof in the circumferential direction. The position in the axial direction of the second welded portion 22 is the same over the entire length thereof in the circumferential direction. Additionally, the second welded portion 22 may continuously extend over the entire length thereof in the circumferential direction while being displaced in the axial direction.

The intermediate welded portion 23 is provided between the first welded portion 21 and the second welded portion 22 and joins the inner peripheral surface of the main body cylinder portion 11 and the outer peripheral surface of the fitting portion 16. Similarly to the second welded portion 22, the intermediate welded portion 23 is formed by melting and integrating the entire area in the radial direction (the thickness direction) of the main body cylinder portion 11 and the outer peripheral surface of the fitting portion 16 while the fitting portion 16 is fitted into the main body cylinder portion 11. The intermediate welded portion 23 extends in the circumferential direction over an angle range of about 180° around the center axis O of the main body cylinder portion 11 and connects the first welded portion 21 and the second welded portion 22. The intermediate welded portion 23 extends toward one side in the axial direction as it extends toward one side in the circumferential direction. That is, the intermediate welded portion 23 is formed in a spiral shape which extends toward one side in the axial direction as it extends toward one side in the circumferential direction. In this case, the spiral intermediate welded portion 23 is wound around the center axis O of the main body cylinder portion 11.

Additionally, for example, the intermediate welded portion 23 may extend straight in the axial direction or may extend in the axial direction while being curved in the circumferential direction. Further, for example, a configuration may be employed in which the first welded portion 21 continuously extending over the entire length thereof in the circumferential direction and the second welded portion 22 continuously extending over the entire length thereof in the circumferential direction are provided discontinuously and independently to be separated from each other in the axial direction without providing the intermediate welded portion 23.

The first welded portion 21, the second welded portion 22, and the intermediate welded portion 23 are connected to each other and extend in an endless shape. The first welded portion 21, the second welded portion 22, and the intermediate welded portion 23 are formed by, for example, laser welding or the like. In the case of laser welding, it is possible to reduce the processing time, realize a welding operation in the atmosphere, and reduce the heated area to a localized area.

Additionally, the first welded portion 21, the second welded portion 22, and the intermediate welded portion 23 may be formed by other welding methods, not limited to laser welding. Further, a configuration may be employed which includes the first welded portion 21 continuously extending over the entire length thereof in the circumferential direction, the second welded portion 22 extending in the circumferential direction at an angle smaller than 360° around the center axis O of the main body cylinder portion 11, and the intermediate welded portion 23.

Next, a method for manufacturing the stabilizer 1 with the above-described configuration will be described.

Figure 4:
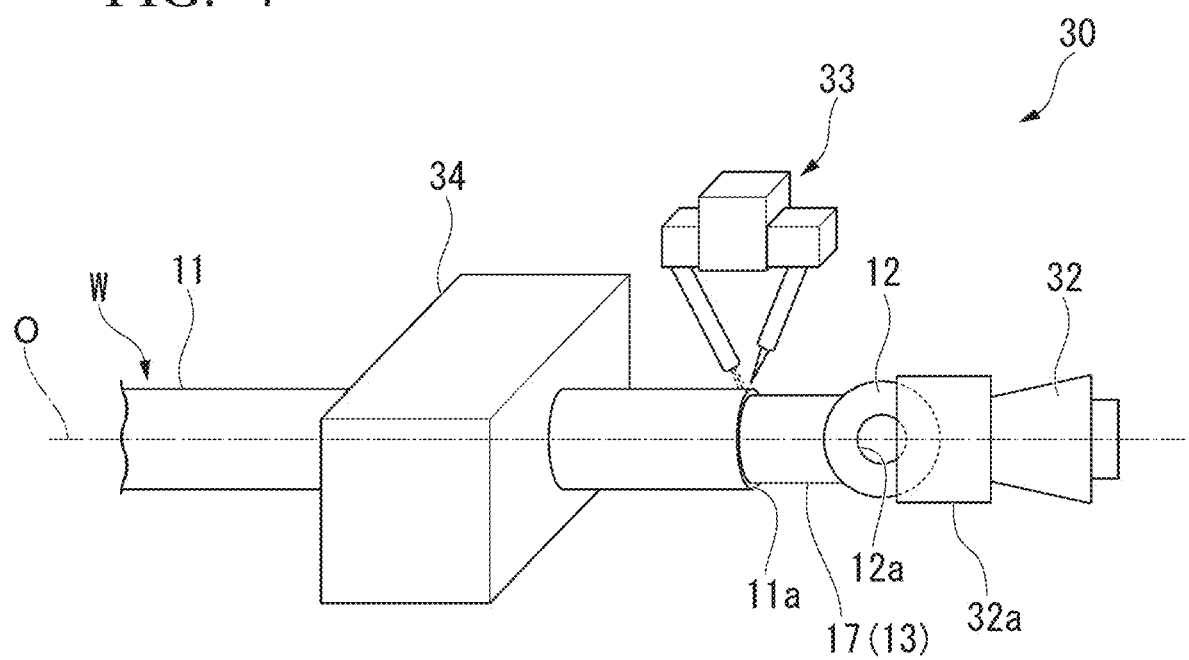
FIG. 4 is an explanatory diagram illustrating a method for manufacturing the stabilizer shown as an embodiment of the present invention.

As shown in FIG. 3, an assembly W of the main body cylinder portion 11, the connection portion 12, and the fixed shaft portion 13, in which the fitting portion 16 is fitted into the main body cylinder portion 11 and the step portion 17a is abutted against the opening end edge 11a of the main body cylinder portion 11, is set to a manufacturing apparatus 30 shown in FIG. 4. At this time, the torsion portion 14 and the pair of arm portions 15 are not formed in the main body cylinder portion 11 and the main body cylinder portion 11 extends straight over the entire length thereof.

Then, the large diameter portion 17 and the opening end edge 11a of the main body cylinder portion 11 are joined by irradiating the contact portion between the opening end edge 11a of the main body cylinder portion 11 and the step portion 17a with a laser (or a laser and a gas) from the laser welding machine 33 while rotating the assembly W around the center axis O by a rotating machine 32 in a state in which the contact portion faces the laser welding machine 33, so that the first welded portion 21 is formed in which the position thereof in the axial direction is the same over the entire length in the circumferential direction.

Here, the rotating machine 32 is provided with a jig 32a which holds the connection portion 12 in an attachable and detachable manner. The manufacturing apparatus 30 includes a positioner 34 which rotatably supports the intermediate portion of the main body cylinder portion 11 in the axial direction.

Next, the inner peripheral surface of the main body cylinder portion 11 and the outer peripheral surface of the fitting portion 16 are joined by moving the laser welding machine 33 in the axial direction while continuously rotating the assembly W by the rotating machine 32 and radiating the laser and the gas from the laser welding machine 33, so that the intermediate welded portion 23 is formed to extend toward one side in the axial direction as it extends toward one side in the circumferential direction.

Next, the inner peripheral surface of the main body cylinder portion 11 and the outer peripheral surface of the fitting portion 16 are joined by stopping the movement of the laser welding machine 33 in the axial direction while continuously rotating the assembly W by the rotating machine 32 and radiating the laser and the gas from the laser welding machine 33, so that the second welded portion 22 is formed in which the position thereof in the axial direction is the same over the entire length in the circumferential direction.

That is, the outer peripheral surface of the main body cylinder portion 11 is irradiated with the laser and the gas from the laser welding machine 33 to melt the main body cylinder portion 11 and the fitting portion 16 and weld the inner peripheral surface of the main body cylinder portion 11 and the outer peripheral surface of the fitting portion 16, so that the intermediate welded portion 23 and the second welded portion 22 are formed.

As described above, the first welded portion 21, the second welded portion 22, and the intermediate welded portion 23 which are connected to each other and extend in an endless shape are formed.

Then, the main body cylinder portion 11 is heated to a temperature lower than the A1 transformation point, the main body cylinder portion 11 is bent to form the torsion portion 14 and the pair of arm portions 15, and all of the main body cylinder portion 11, the connection portion 12, and the fixed shaft portion 13 are heated to a temperature equal to or higher than the A1 transformation point and lower than the melting point by, for example, resistance heating and quenched. As described above, the stabilizer 1 can be obtained.

Additionally, this quenching may be performed before forming the first welded portion 21, the second welded portion 22, and the intermediate welded portion 23. Further, this quenching may be applied only to the main body cylinder portion 11.

As described above, according to the stabilizer 1 of this embodiment, since the fixed shaft portion 13 includes the large diameter portion 17 formed to have a diameter larger than that of the fitting portion 16, the step portion 17a formed in the large diameter portion 17 can be abutted against the opening end edge 11a of the main body cylinder portion 11 as shown in FIG. 3 when joining the opening end edge 11a of the main body cylinder portion 11 and the large diameter portion 17. Accordingly, the fixed shaft portion 13 can be easily and reliably brought into contact with the main body cylinder portion 11 over the entire circumference thereof compared to the case in which the inner peripheral surface of the main body cylinder portion 11 is brought into contact with and the outer peripheral surface of the fitting portion 16.

Then, since the opening end edge 11a of the main body cylinder portion 11 and the large diameter portion 17 are continuously joined over the entire length thereof in the circumferential direction by the first welded portion 21, the inside of the main body cylinder portion 11 can be reliably sealed. Further, since the first welded portion 21 joins the opening end edge 11a of the main body cylinder portion 11 and the large diameter portion 17, it is possible to ensure a wide joint area between the main body cylinder portion 11 and the fixed shaft portion 13 compared to the second welded portion 22 joining the inner peripheral surface of the main body cylinder portion 11 and the outer peripheral surface of the fitting portion 16 and to improve fatigue strength.

Since the step portion 17a of the large diameter portion 17 can be abutted against the opening end edge 11a of the main body cylinder portion 11 when joining the opening end edge 11a of the main body cylinder portion 11 and the large diameter portion 17, it is possible to easily and accurately determine the relative position of the main body cylinder portion 11 and the fixed shaft portion 13 in the axial direction at the time of the joining.

Since both the first welded portion 21 and the second welded portion 22 are provided, it is possible to reliably improve fatigue strength.

Since the fixed shaft portion 13 and the main body cylinder portion 11 are joined to each other by welding and are separate members, it is possible to increase the thicknesses of the fixed shaft portion 13 and the connection portion 12, for example, even when the main body cylinder portion 11 is made thinner to decrease the weight of the stabilizer 1 and thus to ensure the strength of the fixed shaft portion 13 and the connection portion 12.

Since the first welded portion 21 and the second welded portion 22 are connected to each other and continuously extend, it is possible to continue the operation of the manufacturing apparatus 30 without stopping the operation by using the same manufacturing apparatus 30 when forming the first welded portion 21 and the second welded portion 22 and to improve the manufacturing efficiency.

Since the first welded portion 21, the second welded portion 22, and the intermediate welded portion 23 are connected to each other and extend in an endless shape, it is possible to prevent the occurrence of a terminal portion that is easily deteriorated in the first welded portion 21, the second welded portion 22, and the intermediate welded portion 23. Accordingly, it is possible to reliably improve fatigue strength and to prevent deterioration of appearance.

Since the first welded portion 21, the second welded portion 22, and the intermediate welded portion 23 are connected to each other and extend in an endless shape, it is possible to ensure a wide joint area between the main body cylinder portion 11 and the fixed shaft portion 13 and to reliably improve fatigue strength.

Figure 5:
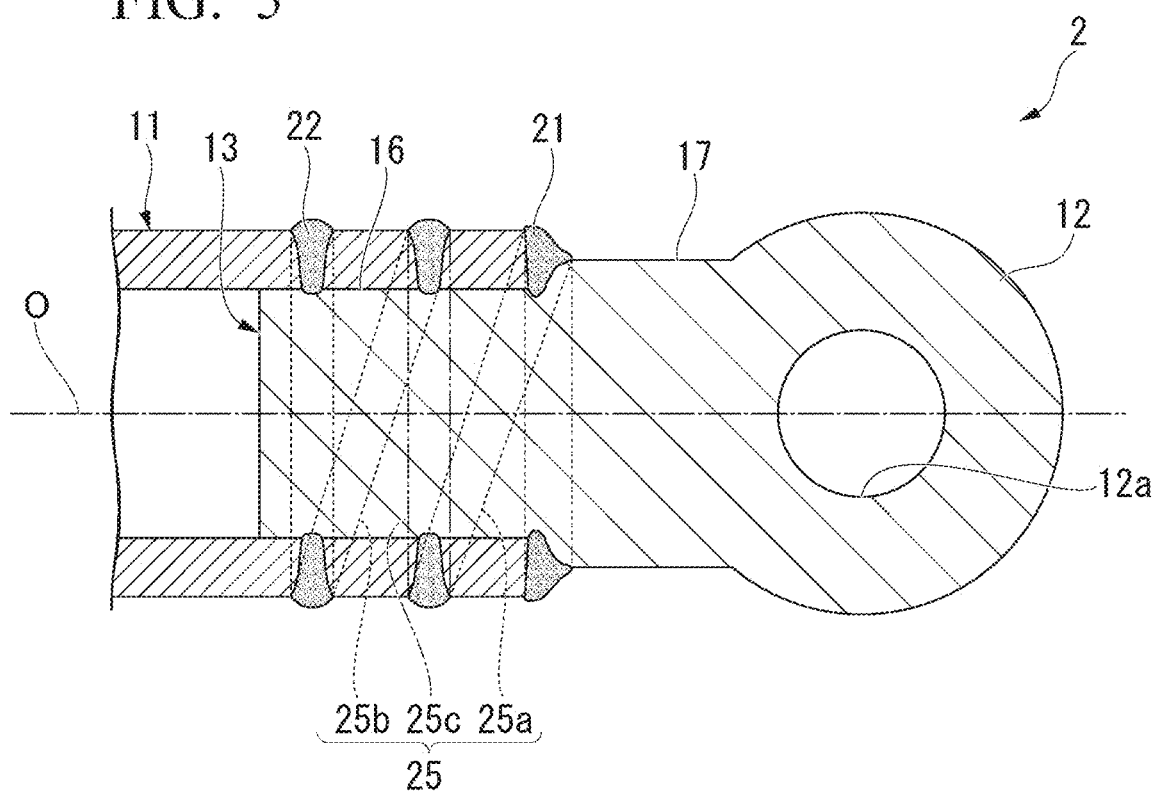
FIG. 5 is a partially longitudinal sectional view of a stabilizer shown as a second embodiment of the present invention.

Next, a stabilizer 2 according to a second embodiment of the present invention will be described with reference to FIG. 5.

Additionally, in the second embodiment, the same parts as the components in the first embodiment are designated by the same reference numerals, the description thereof will be omitted, and only the different points will be described.

In the stabilizer 2 of this embodiment, an intermediate welded portion 25 extends in the circumferential direction over an angle range exceeding 360° around the center axis O of the main body cylinder portion 11.

The intermediate welded portion 25 includes a first intermediate welded portion 25a of which one end portion is connected to the first welded portion 21, a second intermediate welded portion 25b of which one end portion is connected to the second welded portion 22, and a third intermediate welded portion 25c which connects the other end portions of the first intermediate welded portion 25a and the second intermediate welded portion 25b. Each of the first intermediate welded portion 25a, the second intermediate welded portion 25b, and the third intermediate welded portion 25c extends in the circumferential direction over an angle range of about 180° around the center axis O of the main body cylinder portion 11.

Each of the first intermediate welded portion 25a and the second intermediate welded portion 25b extends toward one side in the axial direction as it extends toward one side in the circumferential direction. That is, each of the first intermediate welded portion 25a and the second intermediate welded portion 25b is formed in a spiral shape which extends toward one side in the axial direction as it extends toward one side in the circumferential direction. In this case, the first intermediate welded portion 25a and the second intermediate welded portion 25b are wound around the center axis O of the main body cylinder portion 11.

The first intermediate welded portion 25a and the second intermediate welded portion 25b are respectively provided in the same circumferential region and extend almost in parallel when viewed from the outside in the radial direction. The positions in the axial direction of the other end portion of the first intermediate welded portion 25a on the side opposite to the first welded portion 21 and the other end portion of the second intermediate welded portion 25b on the side opposite to the second welded portion 22 are the same as each other.

The position in the axial direction of the third intermediate welded portion 25c is the same over the entire length thereof in the circumferential direction.

Additionally, the intermediate welded portion 25 may be formed in a spiral shape which extends toward one side in the axial direction as it extends toward one side in the circumferential direction over the entire length thereof.

As described above, according to the stabilizer 2 of this embodiment, since the intermediate welded portion 25 extends in the circumferential direction over an angle range exceeding 360° around the center axis O of the main body cylinder portion 11, it is possible to ensure the length of the intermediate welded portion 25 and to reliably improve fatigue strength.

Also in this embodiment, the same effect as that of the above-described embodiment is obtained.

Additionally, the technical scope of the present invention is not limited to the above-described embodiments and various modifications can be made within the scope of the present invention.

In the above-described embodiments, the step portion 17a of the large diameter portion 17 is abutted against the opening end edge 11a of the main body cylinder portion 11 when joining the opening end edge 11a of the main body cylinder portion 11 and the large diameter portion 17, but an axial gap may be provided between the step portion 17a and the opening end edge 11a of the main body cylinder portion 11 at the time of the joining.

The second welded portion 22 may extend toward one side in the axial direction as it extends toward one side in the circumferential direction and may extend in the circumferential direction over an angle range smaller than 360° around the center axis O of the main body cylinder portion 11.

The connection portion 12 may protrude in the left and right direction from the arm portion 15 of the main body cylinder portion 11 and the configuration of the stabilizer may be appropriately changed.

In the above-described embodiments, a configuration may be employed in which the first welded portion 21 continuously extending over the entire length thereof in the circumferential direction and the second welded portion 22 disposed in an angle range smaller than 360° around the center axis O of the main body cylinder portion 11 are provided without providing the intermediate welded portions 23 and 25 and the first welded portion 21 and the second welded portion 22 are separated from each other.

A configuration may be employed in which the first welded portion 21 and the second welded portion 22 are connected to each other to continuously extend without providing the intermediate welded portions 23 and 25.

In addition, the components in the above-described embodiments can be appropriately replaced with well-known components within the scope of the present invention and the above-mentioned modified examples may be appropriately combined.

INDUSTRIAL APPLICABILITY

The present invention can be used in a stabilizer including a main body cylinder portion and a pair of connection portions.

DESCRIPTION OF REFERENCE NUMERAL 1, 2 Stabilizer
11 Main body cylinder portion
11a Opening end edge
12 Connection portion
13 Fixed shaft portion
16 Fitting portion
17 Large diameter portion
21 First welded portion
22 Second welded portion
23, 25 Intermediate welded portion
50 Suspension device
O Center axis

The invention claimed is:
1. A stabilizer comprising:
a main body cylinder portion which is elastically deformable; and
a pair of connection portions respectively connected to a pair of left and right suspension devices,
wherein each of the pair of connection portions is provided with a fixed shaft portion which is solid and fixed to the main body cylinder portion,
wherein the fixed shaft portion includes a fitting portion fitted into the main body cylinder portion and a large diameter portion connecting the fitting portion and a connection portion of the pair of connection portions and formed to have a diameter larger than that of the fitting portion, and
wherein the stabilizer is provided with a first welded portion joining an opening end edge of the main body cylinder portion and the large diameter portion and continuously extending over the entire length thereof in a circumferential direction around a center axis of the main body cylinder portion and a second welded portion joining an inner peripheral surface of the main body cylinder portion and an outer peripheral surface of the fitting portion.

2. The stabilizer according to claim 1,
wherein the first welded portion and the second welded portion are connected to each other and continuously extend.

3. The stabilizer according to claim 2,
wherein the second welded portion continuously extends over the entire length thereof in the circumferential direction,
wherein an intermediate welded portion is provided between the first welded portion and the second welded portion to join the inner peripheral surface of the main body cylinder portion and the outer peripheral surface of the fitting portion, and
wherein the first welded portion, the second welded portion, and the intermediate welded portion are connected to each other and extend in an endless shape.

4. The stabilizer according to claim 3,
wherein the intermediate welded portion extends in the circumferential direction over an angle range exceeding 360° around the center axis of the main body cylinder portion.

\* \* \* \* \*